US009009597B2

(12) United States Patent
Lee et al.

(10) Patent No.: US 9,009,597 B2
(45) Date of Patent: Apr. 14, 2015

(54) METHOD FOR DISPLAYING DEVICE CONNECTED MEDIA SIGNAL SINK AND MEDIA SIGNAL SINK THEREOF

(75) Inventors: Yongdong Lee, Gumi-si (KR); Jaemin Choi, Gumi-si (KR); Jae Min Ha, Gumi-si (KR); Jae Kyung Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1251 days.

(21) Appl. No.: 12/523,269

(22) PCT Filed: Jan. 25, 2008

(86) PCT No.: PCT/KR2008/000470
§ 371 (c)(1),
(2), (4) Date: Jan. 15, 2010

(87) PCT Pub. No.: WO2008/091127
PCT Pub. Date: Jul. 31, 2008

(65) Prior Publication Data
US 2010/0115433 A1    May 6, 2010

(30) Foreign Application Priority Data

Jan. 26, 2007   (KR) ........................ 10-2007-0008362

(51) Int. Cl.
*G06F 3/00* (2006.01)
*H04N 5/765* (2006.01)
(Continued)

(52) U.S. Cl.
CPC ............ *H04N 5/765* (2013.01); *H04N 21/4622* (2013.01); *H04N 5/4403* (2013.01);
(Continued)

(58) Field of Classification Search
CPC .... G06F 3/048; H04N 5/765; H04N 5/44543; H04N 21/4622; H04N 5/782; H04N 5/85; H04N 21/4108; H04N 21/43615; H04N 21/43635; H04L 5/4403; H04L 12/2809; H04L 12/2814
USPC .......... 715/718, 717, 716; 348/14.04; 725/37, 725/38, 59

See application file for complete search history.

(56) References Cited

U.S. PATENT DOCUMENTS

| 5,760,698 | A | * | 6/1998 | Iijima et al. .................. 340/3.43 |
| 6,118,450 | A |   | 9/2000 | Proehl et al. |

(Continued)

FOREIGN PATENT DOCUMENTS

| CN | 1265754 A | 9/2000 |
| CN | 1598921 A | 3/2005 |

(Continued)

OTHER PUBLICATIONS

HDMI Specification Version 1.3a, Nov. 10, 2006, www.evernew.com.tw/HDMISpecification13a.pdf.*

(Continued)

*Primary Examiner* — Patrick Riegler
(74) *Attorney, Agent, or Firm* — Birch, Stewart, Kolasch & Birch, LLP (57) ABSTRACT

A method for displaying a menu corresponding to one or more devices included in the one or more media signal sources connected to the media signal sink. The method includes checking connection states of the one or more signal sources to the signal sink, displaying menu items of the one or more devices included in one or more signal sources connected to the signal sink in a graphic user interface (GUI) screen, based on a result of the connection state check; selecting a specific one of the menu items displayed in the GUI screen, determining whether a device corresponding to the selected menu item, among the one or more devices included in the one or more signal sources, is in its on or off state, generating a signal for turning-on the corresponding device when it is determined that the corresponding device is in its off state and transmitting the generated turning-on signal to the corresponding device.

24 Claims, 7 Drawing Sheets

(51) Int. Cl.
    *H04L 12/28*     (2006.01)
    *H04N 5/445*     (2011.01)
    *H04N 21/41*     (2011.01)
    *H04N 21/436*     (2011.01)
    *H04N 21/4363*     (2011.01)
    *H04N 21/462*     (2011.01)
    *H04N 5/44*     (2011.01)
    *H04N 5/782*     (2006.01)
    *H04N 5/85*     (2006.01)

(52) U.S. Cl.
    CPC ........ *H04L 12/2809* (2013.01); *H04L 12/2814* (2013.01); *H04N 5/44543* (2013.01); *H04N 5/782* (2013.01); *H04N 5/85* (2013.01); *H04N 21/4108* (2013.01); *H04N 21/43615* (2013.01); *H04N 21/43635* (2013.01)

(56) References Cited

U.S. PATENT DOCUMENTS

| | | | |
|---|---|---|---|
| 6,421,069 | B1 | 7/2002 | Ludtke et al. |
| 7,810,129 | B2 * | 10/2010 | Yamada et al. ............... 725/133 |
| 2001/0007455 | A1 * | 7/2001 | Yoo et al. ...................... 345/856 |
| 2001/0050679 | A1 * | 12/2001 | Shigeta ......................... 345/204 |
| 2003/0107605 | A1 | 6/2003 | Iwamura |
| 2003/0227568 | A1 * | 12/2003 | Stahl et al. .................... 348/552 |
| 2004/0105663 | A1 * | 6/2004 | Kim et al. ...................... 386/113 |
| 2005/0060660 | A1 * | 3/2005 | Song ............................. 715/781 |
| 2005/0102699 | A1 * | 5/2005 | Kim et al. ...................... 725/81 |
| 2005/0165967 | A1 * | 7/2005 | Woolgar ........................... 710/1 |
| 2005/0281539 | A1 * | 12/2005 | Na .................................. 386/83 |
| 2006/0007933 | A1 * | 1/2006 | Maxson et al. ............... 370/392 |
| 2006/0010383 | A1 * | 1/2006 | Tanaka et al. ................. 715/716 |
| 2006/0164561 | A1 * | 7/2006 | Lacy et al. .................... 348/706 |
| 2006/0195412 | A1 * | 8/2006 | Slemmer et al. ................ 706/47 |
| 2006/0230360 | A1 * | 10/2006 | Young et al. .................. 715/781 |
| 2006/0248557 | A1 * | 11/2006 | Stark et al. ...................... 725/37 |
| 2007/0052733 | A1 * | 3/2007 | Hirabayashi et al. ......... 345/661 |
| 2007/0061757 | A1 * | 3/2007 | Kobayashi .................... 715/828 |
| 2008/0136972 | A1 * | 6/2008 | Blankenburg ................. 348/734 |
| 2008/0225038 | A1 * | 9/2008 | Jeong ............................ 345/418 |
| 2009/0102971 | A1 * | 4/2009 | Chang et al. .................. 348/554 |

FOREIGN PATENT DOCUMENTS

| | | |
|---|---|---|
| CN | 1700802 A | 11/2005 |
| EP | 1650962 A1 | 4/2006 |
| KR | 10-2005-0074693 A | 7/2005 |
| KR | 10-2006-0035858 A | 4/2006 |
| KR | 10-2006-0047033 A | 5/2006 |
| KR | 10-2006-0099785 A | 9/2006 |
| KR | 10-2006-0116446 A | 11/2006 |
| TW | 200636478 A | 10/2006 |

OTHER PUBLICATIONS

European Search Report dated Dec. 22, 2010 corresponding to European Application No. 08712195.

"Supplemental 1, Consumer Electronics Control (CEC)," High-Definition Multimedia Interface Specification, Version 1.2, XP003003035, HDMI Licensing, LLC., Aug. 22, 2005, pp. 1-84.

* cited by examiner

METHOD FOR DISPLAYING DEVICE CONNECTED MEDIA SIGNAL SINK AND MEDIA SIGNAL SINK THEREOF

TECHNICAL FIELD

The present invention relates to media signal processing, and more particularly, to a media signal sink having a graphic user interface (GUI) function and a method for displaying devices connected thereto.

BACKGROUND ART

Recently, a high-definition multimedia interface (HDMI) standard has been developed and published which transmits a digital video signal and a digital audio signal via a single digital interface with a bandwidth of 5 Gbps or more. The HDMI is a digital audio/video interface that can transmit a stream, not compressed. This HDMI provides an interface between a compatible digital audio/video source and a compatible digital audio/video monitor (for example, a television (TV)).

Under the condition that an audio/video monitor is interfaced with audio/video sources in an HDMI manner, the user has to control the audio/video sources and the audio/video monitor individually. For this reason, much time and inconvenience are involved in controlling the sources and monitor. As a result, there is a need for a user interface environment to control them in an integrated manner.

One approach is to provide a GUI screen through an audio/video monitor. However, this GUI screen just lists and shows only various output formats (for example, a component, RGB, HDMI, etc.) and various HDMI ports (for example, HDMI1, HDMI2, etc.) of audio/video sources.

Moreover, in the above-mentioned GUI method, in order to select a desired mode from the list on the GUI screen, the user is required to know which audio/video source was pinned to which port of the audio/video monitor.

In addition, in the case where an audio/video source has a plurality of devices, the user cannot access the respective devices individually through the GUI screen. Further, the user is unable not only to know the type of a currently operable device through the GUI screen, but also to easily identify that device.

DISCLOSURE

Technical Problem

An object of the present invention devised to solve the problem lies on a media signal sink and a method for displaying devices connected thereto, wherein, under the condition that various devices are interconnectable in an HDMI manner, a GUI screen is provided to enable the user to easily know and control the states of the respective devices in an integrated manner.

Technical Solution

The object of the present invention can be achieved by providing, in a method for operating a media signal sink connected with one or more signal sources each having one or more devices, a method for displaying one or more devices connected to the media signal sink, comprising: checking connection states of the signal sources to the signal sink; and displaying menu items of the devices of the signal sources connected to the signal sink in a graphic user interface (GUI) screen, based on a result of the connection state check.

In the GUI screen, menu items of the same type of devices, among the devices of the signal sources, may be displayed under the condition that they are grouped into one group. Alternatively, in the GUI screen, menu items of devices corresponding to the same type of signal sources, among the devices of the signal sources, may be displayed under the condition that they are grouped into one group.

In the GUI screen, menu items of devices selectable by a user, among the devices of the signal sources, and menu items of devices non-selectable by the user may be displayed distinguishably from each other.

In the GUI screen, a menu item of a device selected by a user, among the devices of the signal sources, and menu items of the other devices not selected by the user may be displayed distinguishably from each other.

In the GUI screen, a menu item of a device currently in operation, among the devices of the signal sources, and menu items of the other devices not in operation may be displayed distinguishably from each other.

The step of checking the connection states of the signal sources to the signal sink may comprise checking a connection state of each of the devices of the signal sources to the signal sink by identifying a unique address recorded in each of the devices of the signal sources.

The method for displaying the one or more devices connected to the media signal sink may further comprise: selecting a specific one of the menu items displayed in the GUI screen; generating a command for control of a device corresponding to the selected menu item, among the devices of the signal sources; and transmitting the generated control command to the corresponding device to operate the corresponding device.

Alternatively, the method for displaying the one or more devices connected to the media signal sink may further comprise: selecting a specific one of the menu items displayed in the GUI screen; determining whether a device corresponding to the selected menu item, among the devices of the signal sources, is in its on or off state; generating a signal for turning-on of the corresponding device and a command for control of the corresponding device if it is determined that the corresponding device is in its off state; and transmitting the generated turning-on signal and control command to the corresponding device to operate the corresponding device.

In the GUI screen, each of the menu items may be indicated by at least one of a device name and an icon.

In another aspect of the present invention, provided herein is a media signal sink with a graphic user interface (GUI) function connected with one or more signal sources each having one or more devices, the media signal sink comprising: a main processor for checking connection states of the signal sources to the signal sink; a GUI screen creator for creating a GUI screen to display menu items of the devices of the signal sources connected to the signal sink, based on a result of the connection state check of the main processor; and a display device for displaying the GUI screen created by the GUI screen creator.

The media signal sink may further comprise an auxiliary processor for transmitting/receiving a GUI frame containing the unique address to/from each of the signal sources and outputting the received GUI frame to the main processor.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts. Besides, although terms used in the present invention are possibly selected from the currently well-known ones, some terms are arbitrarily chosen by the inventor in some cases so that their meanings are explained in detail in the following description. Hence, the present invention should be understood with the intended meanings of the corresponding terms chosen by the inventor instead of the simple names or meanings of the terms themselves.

Hereinafter, for a better understanding of the present invention, the overall system of at least one signal source and a media signal sink will be described with reference to FIG. 1.

Figure 1:
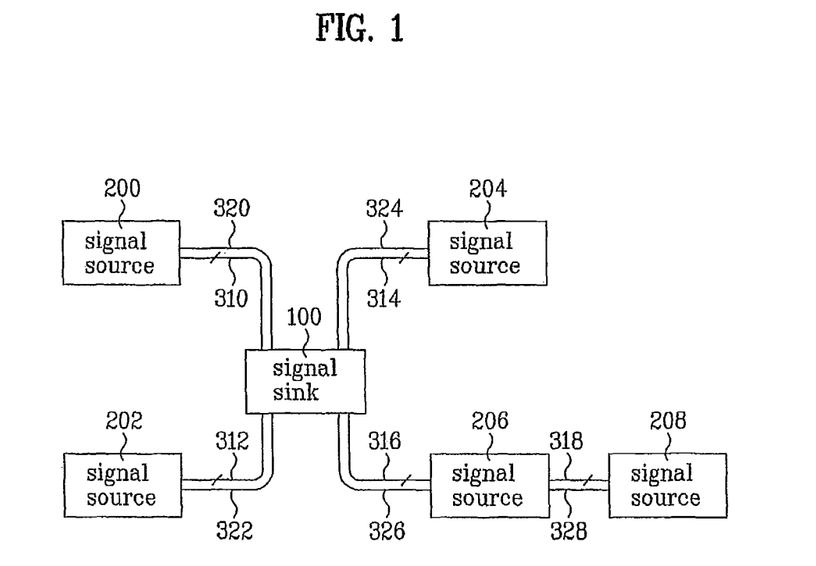
FIG. 1 is a block diagram schematically showing the overall system of a media signal sink and signal sources according to one embodiment of the present invention.

FIG. 1 is a block diagram schematically showing the overall system of a media signal sink and signal sources according to one embodiment of the present invention. As shown in FIG. 1, the system comprises a media signal sink 100, signal sources 200 to 208, HDMI channel lines 310 to 318, and HDMI-consumer electronics control (CEC) lines 320 to 328. Although the four signal sources 200 to 208 are shown to be connected to the signal sink 100, more or less than four signal sources may be connected to the signal sink 100.

Referring to FIG. 1, the signal sink 100 receives and processes an audio and/or video signal from each of the signal sources 200 to 208 and shows a result of the processing through a display device (not shown) or monitor (not shown). The signal sink 100 functioning in this manner may be a video display device such as a television (TV), projector or monitor. Also, the signal sink 100 may include at least one device.

Each of the signal sources 200 to 208 can store, reproduce and/or process an audio and/or video signal. Also, each of the signal sources 200 to 208 provides an audio and/or video signal to the signal sink 100, and is interfaced with the signal sink 100 via at least one physical port. Each of the signal sources 200 to 208 may include a plurality of devices. Provided that a plurality of signal sources are connected in the form of a composite unit to the signal sink 100 via one physical port, a description of the present invention will be given under the condition that the composite unit is regarded as one signal source and the respective signal sources included in the composite unit are regarded as devices.

Applied as each of the signal sources 200 to 208 may be an audio/video source such as a set top box (STB), a personal computer (PC), a video game system, a digital video disc (DVD) recorder, a hard disk drive (HDD) recorder included in an STB or DVD recorder, a home theater system (HTS) or a video cassette recorder (VCR).

The signal sink 100 and the signal sources 200 to 208 are interconnected in an HDMI manner via the lines 310 to 318 for HDMI channels and the HDMI-CEC lines 320 to 328. Although the HDMI channel line and the CEC line are shown to be separated from each other for a better understanding of the present invention, it should be noted here that they are integrated into one cable.

Hereinafter, the configuration and operation of the signal sink 100 according to one embodiment of the present invention will be described with reference to FIGS. 2 and 3.

Figure 2:
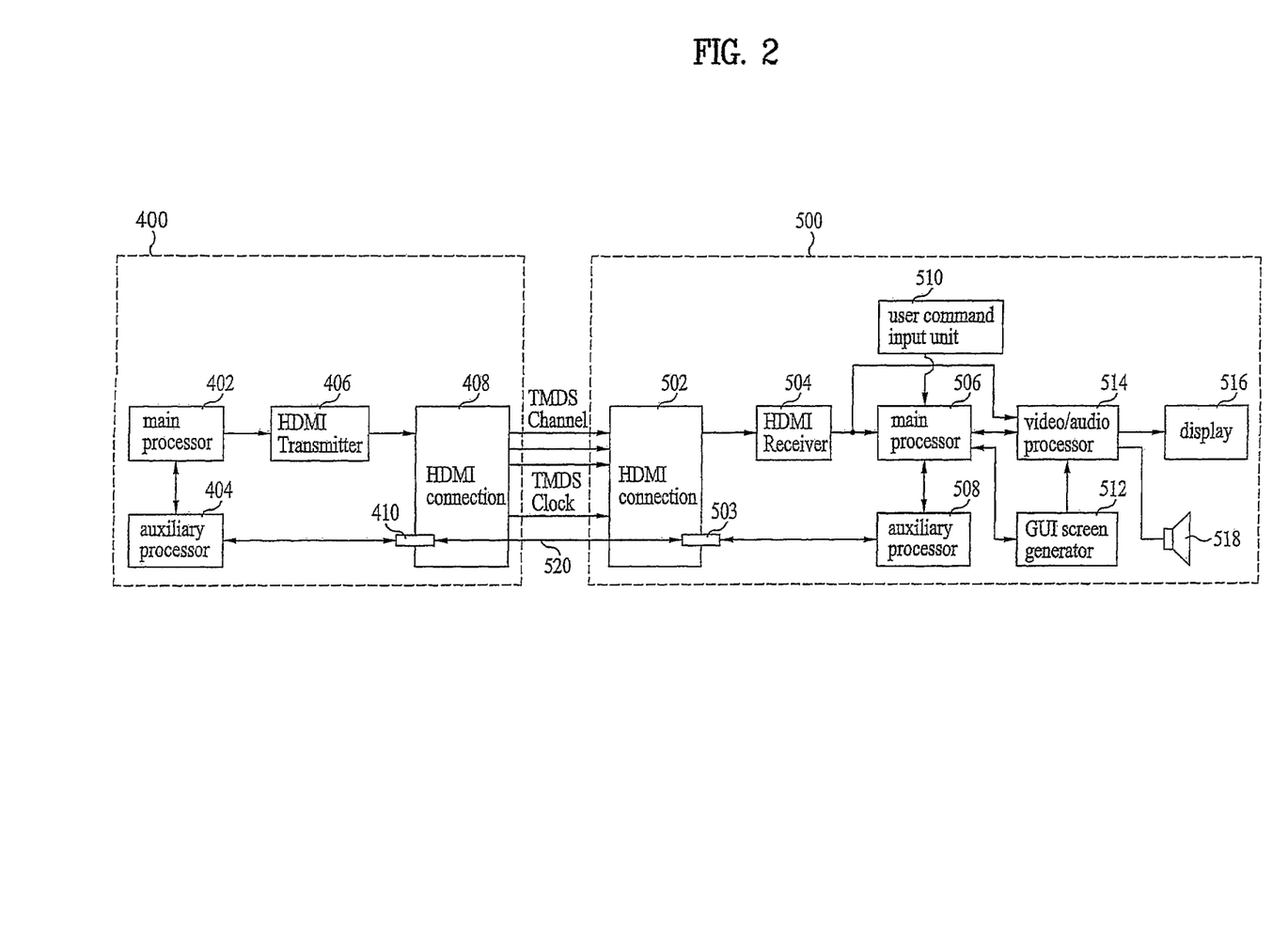
FIG. 2 is a block diagram showing the configuration of a media signal sink according to one embodiment of the present invention.

FIG. 2 is a block diagram showing the configuration of the signal sink 100 according to one embodiment of the present invention. In FIG. 2, the reference numeral 400 denotes a signal source, 500 denotes a media signal sink, and 520 denotes HDMI channel lines and HDMI-CEC lines.

The signal source 400, which corresponds to each of the signal sources 200 to 208 shown in FIG. 1, includes a main processor 402, auxiliary processor 404, HDMI transmitter 406, and HDMI connector 408.

The signal sink 500, which corresponds to the signal sink 100 shown in FIG. 1, includes an HDMI connector 502, HDMI receiver 504, main processor 506, auxiliary processor 508, user command input unit 510, GUI screen creator 512, video/audio processor 514, display device 516, and speaker 518.

The auxiliary processor 404 transmits a CEC frame to the signal sink 500 through a pin 410 of the HDMI connector 408 or receives a CEC frame transmitted from the signal sink 500 through the pin 410 and provides a header block and data block of the received CEC frame to the main processor 402.

The auxiliary processor 508 transmits a CEC frame to the signal source 400 through a pin 503 of the HDMI connector 502 or receives a CEC frame transmitted from the signal source 400 through the pin 503 and provides a header block and data block of the received CEC frame to the main processor 506.

The pin 410 or 503 can be assigned a No. 13 pin of the HDMI connector 408 or 502 when the HDMI connector 408 or 502 is A-type, a No. 22 pin when the HDMI connector 408 or 502 is B-type, and a No. 14 pin when the HDMI connector 408 or 502 is C-type.

Each of the auxiliary processors 404 and 508 can use an interrupt of, for example, a 0.1 ms unit to sample a CEC frame. Although the auxiliary processors 404 and 508 may be included in the main processors 402 and 506, respectively, it is preferable that they be present separately from the main processors 402 and 506 because the 0.1 ms-unit sampling may act as a load on the operations of other parts. In addition, each of the auxiliary processors 404 and 508 performs a CEC line error handling process, CEC frame validation determination process, and CEC frame re-transmission process.

Each of the main processors 402 and 506 processes a CEC protocol layer and application layer. The CEC protocol layer is a middleware layer that implements the operation of a CEC protocol, and provides a standard application programming interface (API) for application development. A porting layer may also be provided in consideration of a hardware modification of the auxiliary processor 404 or 508, etc. The main function of the CEC protocol layer is to configure and manage a device tree with respect to devices connected to the signal link 500 or signal source 400 and manage the status of each device. In particular, the CEC protocol layer encapsulates CEC protocol information from the application layer therein.

The HDMI transmitter 406 of the signal source 400 receives audio/video data from the main processor 402 and transmits the received audio/video data to the signal sink 500 through the HDMI connector 408. At this time, the audio/video data is transmitted over a transition minimized differential signaling (TMDS) link, which is also called a channel link. A TMDS clock is a clock for TMDS.

The HDMI receiver 504 of the signal sink 500 receives audio/video data transmitted from the signal source 400 through the HDMI connector 502 and outputs the received audio/video data to each of the main processor 506 and video/audio processor 514. The user command input unit 510 receives a command inputted by the user and outputs the received command to the main processor 506.

Figure 3:
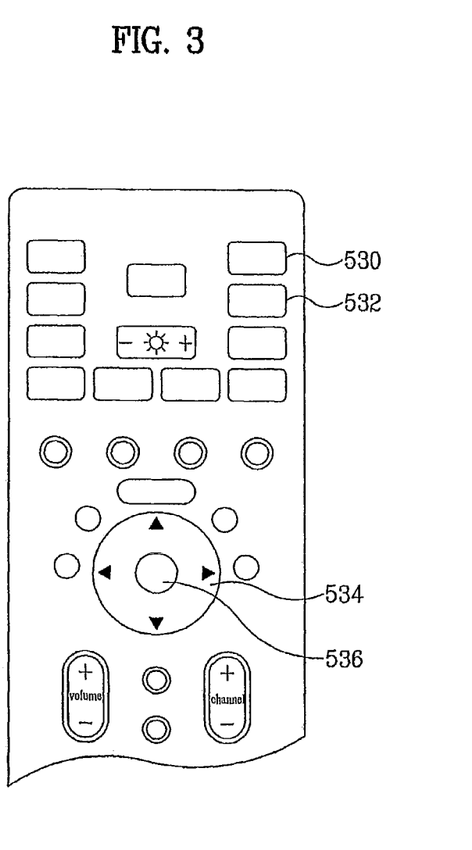
FIG. 3 is a view schematically showing the outer appearance of a remote controller in a user command input unit according to one embodiment of the present invention.

FIG. 3 schematically shows the outer appearance of a remote controller in the user command input unit 510 according to one embodiment of the present invention.

In the case where the user command input unit 510 is implemented with a remote controller, a hotkey 530 can be arranged in the remote controller in the form of a button. The hotkey 530 is pushed by the user when the display of a GUI screen is requested by the user.

The main processor 506 controls the respective parts 508, 512 and 514 of the signal sink 500. The video/audio processor 514 performs an audio signal and/or video signal processing operation, respectively, with respect to audio and/or video data received from the HDMI receiver 504 under the control of the main processor 506.

A result of the video signal processing operation of the video/audio processor 514 is visually provided to the user through the display device 516, and a result of the audio signal processing operation of the video/audio processor 514 is aurally provided to the user through the speaker 518.

The GUI screen creator 512 creates a GUI screen under the control of the main processor 506 and outputs the created GUI screen to the video/audio processor 514. The video/audio processor 514 mixes/processes the GUI screen created by the GUI screen creator 512 with a video signal inputted from the HDMI receiver 504 and displays a result of the processing through the display device 516.

The signal source 206 shown in FIG. 1 may receive an audio/video signal from the signal source 208 and deliver the received audio/video signal to the signal sink 100, or, otherwise, may process the audio/video signal from the signal source 208 by itself. That is, provided that the signal source 206 has the respective parts of the signal sink 500 shown in FIG. 2, it may act as a signal sink for the signal source 208.

Hereinafter, a signal sink operating method for a GUI function according to the present invention will be described with reference to FIGS. 4 to 7. For a better understanding of the present invention, the signal sink operating method is assumed to be performed by the signal sink 500 shown in FIG. 2, but the present invention is not limited thereto.

Figure 4:
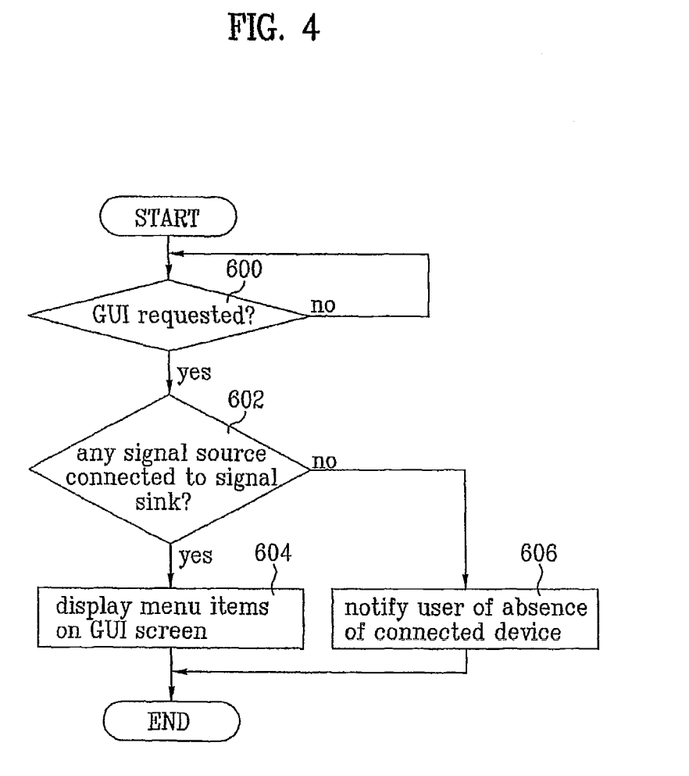
FIG. 4 is a flowchart illustrating a method for displaying devices connected to a media signal sink, according to one embodiment of the present invention.
Figure 5:
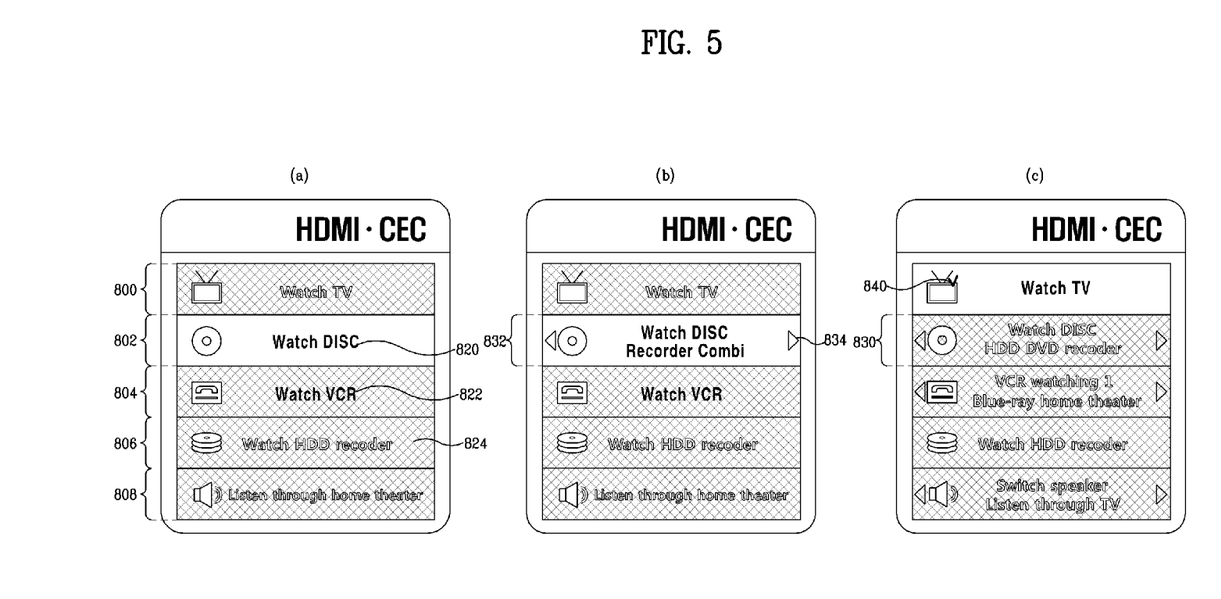
FIGS. 5A to 5C are views showing examples of a GUI screen created according to one embodiment of the present invention.
Figure 6:
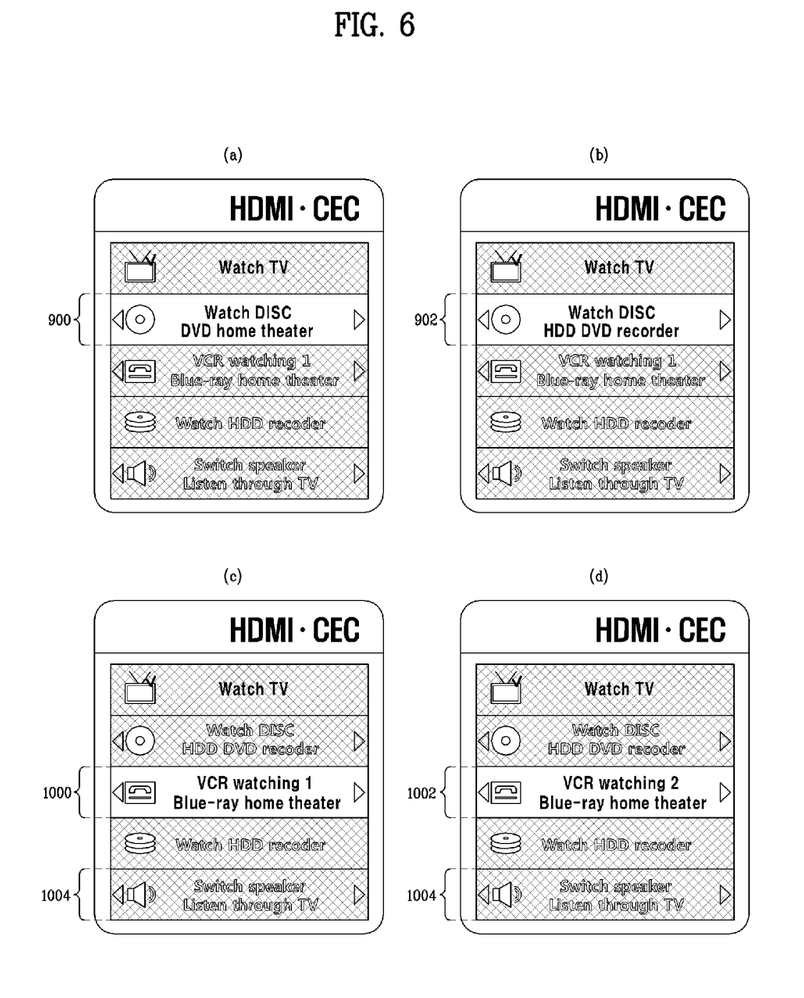
FIGS. 6A to 6D are views illustrating a GUI screen change process according to one embodiment of the present invention.

FIG. 4 is a flowchart illustrating a signal sink operating method according to one embodiment of the present invention.

The main processor 506 determines whether a GUI request command from the user has been inputted from the user command input unit 510 (Step 600).

Upon determining that the GUI request command from the user has been inputted, the main processor 506 determines whether there is a signal source connected to the signal sink 500 (Step 602).

As stated previously, the signal source may have one device, but may also have a plurality of devices. As a result, at step 602, the main processor 506 checks connection states of all devices thereto.

In order to assist this role of the main processor 506, the auxiliary processor 508 receives a CEC frame (or GUI frame) from the signal source 400 and outputs a header/data block of the received CEC frame to the main processor 506.

The main processor 506 can check a connection state of a device thereto using a unique address contained in the header of the CEC frame. This unique address is an inherent logical address or physical address that each device has uniquely.

Based on the unique address that is the logic address or physical address, the main processor 506 can identify each device and check a connection state of each device thereto.

The signal sink 500 may create a unique address in a vendor-specific data block (VSDB) and deliver the created unique address to a corresponding signal source, and check a connection state of a given device by identifying the unique address.

The main processor 506 outputs a result of the device connection state check to the GUI screen creator 512 (Step 604).

Using the check result provided from the main processor 506, the GUI screen creator 512 creates a GUI screen showing a connection state of each device and outputs the created GUI screen to the video/audio processor 514 (Step 604).

The video/audio processor 514 processes the GUI screen created by the GUI screen creator 512 and displays a result of the processing through the display device 516. At this time, as a result of the processing, menu items indicating the connection states of the respective devices are displayed in the GUI screen (Step 604).

If there is no device connected to the signal sink 500, the GUI screen creator 512 may create a GUI screen having menu items indicating such a situation, but may create a separate message (for example, "No device connected") as a GUI screen (Step 606).

Hereinafter, a method for creating a GUI screen in the GUI screen creator 512 and the created GUI screen will be described with reference to FIGS. 5A to 5C and FIGS. 6A to 6D.

FIGS. 5A to 5C show examples of a GUI screen created according to one embodiment of the present invention, in which menu items 800 to 808 corresponding to functions selectable by the user are displayed in the GUI screen.

As shown in FIGS. 5A to 5C, in the GUI screen, each menu item can be indicated by at least one of a device name (TV, DISC, VCR, HDD, or the like) and an icon. As a result, the user can recognize a device connection situation more easily through the GUI screen.

In the GUI screen, menu items corresponding to functions selectable by the user and menu items corresponding to functions non-selectable by the user can be displayed distinguishably from each other. For example, as shown in FIG. 5A, the letters of menu items 800, 802, 806 and 808 corresponding to functions selectable by the user may be displayed with a bright color 824 and the letters of a menu item 804 not so may be displayed with a gray color 822.

If the signal source 400 connected to the signal sink 500 has a device 'HDD Recorder', the letters of the menu item 806 are displayed with the bright color 824 to indicate that the user can select an 'HDD Recorder Appreciation' function. In contrast, if the signal source 400 connected to the signal sink 500 has no device 'VCR', the letters of the menu item 804 are displayed with the gray color 822 to indicate that the user cannot select a VCR Appreciation' function.

In another embodiment of the present invention, menu items corresponding to functions selectable by the user may be visible in the GUI screen and menu items corresponding to functions non-selectable by the user may be invisible in the GUI screen.

On the other hand, in the GUI screen, a menu item corresponding to a function selected by the user and menu items corresponding to functions not selected by the user can be displayed distinguishably from each other. For example, as shown in FIG. 5A, the menu item 802 corresponding to the function selected by the user may be displayed with a background color 820 different from that of the other menu items 800, 804, 806 and 808.

In the GUI screen, a menu item corresponding to a function currently in operation and the other menu items can be displayed distinguishably from each other. For example, as shown in FIG. 5C, if a 'TV View' function is currently in operation, the menu item 800 may further have a chevron marking 840 differently from the other menu items 802 to 808. The user can recognize, through the marking 840, that a television is in operation.

Also, in the GUI screen, menu items of the same function provided from the same type of devices can be sequentially displayed according to the user's selection under the condition that they are grouped into one group.

Alternatively, in the GUI screen, menu items of the same function provided from devices corresponding to the same type of signal sources (namely, devices are different in type, but signal sources thereof are the same in type) may be sequentially displayed according to the user's selection under the condition that they are grouped into one group.

That is, when the same type or different types of devices providing the same function are connected to the signal sink, menu items of the same function provided from the devices can be sequentially displayed in the GUI screen according to the user's selection.

For example, assume that different types of signal sources providing the same type of devices 'DISC' are a 'combi recorder' and an 'HDD DVD recorder'. Here, the combi recorder is one signal source that provides two devices DVD DISC and VTR, and the HDD DVD recorder is one signal source that provides only one device DVD DISC.

In this case, if the user operates a left/right key 830 shown in FIG. 5B using a mouse or remote controller, a menu item 832 is changed from 'Combi Recorder Disc Appreciation' to 'HDD DVD Recorder Disc Appreciation' in the same menu 'Disc Appreciation' as shown in FIG. 5C. That is, the menu item 832 in FIG. 5B is changed to a menu item 834 in FIG. 5C.

In other words, menu items of the same function provided from the same type of devices of different types of signal sources can be displayed in the GUI screen under the condition that they are grouped into one group, thus providing convenience to the user.

FIGS. 6A to 6D illustrate a GUI screen change process according to one embodiment of the present invention, in which one menu item of the same function is changed to another menu item of the same function.

From FIGS. 6A to 6D, it can be seen that a chevron marking on a menu item of a function ('TV View') currently in operation is kept displayed in a GUI screen even while a menu item 900 corresponding to a function selected by the user and menu items corresponding to functions not selected by the user are displayed distinguishably from each other with background colors.

If different types of devices (for example, a 'DVD home theater' and an 'HDD DVD recorder') are connected to the signal sink, menu items 900 and 902 of the same function (for example, 'DISC Appreciation') provided from the devices can be changed from FIG. 6A to FIG. 6B as the user operates the left/right key, as stated previously.

Also, if the same type of devices (for example, 'blu-ray home theaters') are connected to the signal sink, menu items 1000 and 1002 of the same functions (for example, 'VCR Appreciation 1' and 'VCR Appreciation 2') provided from the devices can be changed from FIG. 6C to FIG. 6D as the user operates the left/right key, as stated previously.

If the user operates the left/right key shown in FIG. 6C using a mouse or remote controller, a menu item 1004 is changed from 'Listen to TV' to 'Listen to Home Theater' in the same function 'Speaker Change' as shown in FIG. 6D. That is, the menu item 1004 in FIG. 6C is changed to a menu item 1004 in FIG. 6D. Provided that a specific function (for example, 'HDD Recorder Appreciation') is performed by only one of the devices connected to the signal sink, a menu item of the 'HDD Recorder Appreciation' function has no left/right key, as shown in FIGS. 6A to 6D.

The GUI screens as shown in FIGS. 5A to 5C and FIGS. 6A to 6D can be operated by the remote controller in various ways. For example, the user may scroll menu items in the GUI screen left/right/up/down by operating a left/right/up/down direction key 534 shown in FIG. 3 or may select a desired menu item in the GUI screen by pushing a confirm button 536.

Also, the remote controller may include a cancel key 532 for turning on/off popup of the GUI screen. In addition, when the hotkey 530 is pushed, when there is no input from the user until a predetermined time (for example, 40 seconds) elapses, or when a different menu (for example, TV Guide) is activated, the GUI screen may vanish from the display device 516. In this manner, various embodiments can be applied to operate the GUI screen through the remote controller.

Figure 7:
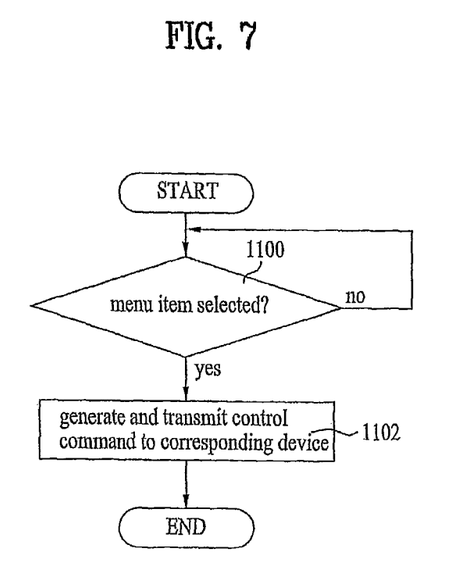
FIG. 7 is a flowchart illustrating a method for displaying devices connected to a media signal sink, according to an alternative embodiment of the present invention.

FIG. 7 is a flowchart illustrating a signal sink operating method according to an alternative embodiment of the present invention.

The main processor 506 determines whether a menu item displayed in a GUI screen has been selected by the user (Step 1100).

If a menu item is selected through the user command input unit 510, the main processor 506 generates a command for control of a device that provides a function corresponding to the selected menu item, and transmits the generated command to the device through the auxiliary processor 508 (Step 1102).

On the other hand, the main processor 506 determines through the auxiliary processor 508 whether the device providing the function corresponding to the menu item, selected in the GUI screen by the user, is in its off or on state.

If it is determined that the device is in its off state, the main processor 506 generates a signal for turning-on of the device and transmits the generated signal to the device through the auxiliary processor 508. After tuning on the device, the main processor 506 controls the device such that the device provides the function of the menu item selected by the user.

According to the present invention, the signal sink 500 may further include a storage unit (not shown) for storing media data and various information. The storage unit includes all types of storage devices or recording media that store data readable by various media systems and computer systems. For example, the storage unit may include a ROM, RAM, CD-ROM, HDD, magnetic tape, floppy disk, optical data storage device, or Internet Web hard.

Industrial Applicability

As apparent from the above description, according to the present invention, connection states of devices to a signal sink are displayed on a GUI screen in an integrated manner, so that the user does not need to in advance recognize which device was connected to which port of the signal sink. Further, the GUI screen is created and expressed by giving the first consideration to devices, not signal sources. Therefore, even though a signal source, which is in the form of a composite unit having a plurality of devices, is connected to the signal sink, the user can recognize/control a desired one of the devices on the GUI screen and conveniently and easily operate a desired function through the GUI screen. In addition, it will be possible to display connection states, etc. of signal sources of various forms to be introduced in future on the GUI screen.

Other implementations are within the scope of the following claims.

The invention claimed is:

1. In a method for operating a media signal sink connected with one or more signal sources each having one or more devices, a method for displaying a menu corresponding to one or more devices included in the one or more media signal sources connected to the media signal sink, comprising:
checking connection states of the one or more signal sources to the signal sink;
displaying a graphical user interface (GUI) including a plurality of menu items associated with one or more devices included in the one or more signal sources connected to the signal sink, based on a result of the connection state check;
selecting a specific one menu item of the plurality of menu items displayed in the GUI screen;
determining whether a device corresponding to the selected specific menu item, among the one or more devices included in the one or more signal sources, is in its on or off state;
generating a signal for turning-on the corresponding device when it is determined that the corresponding device is in its off state;
and transmitting the generated turning-on signal to the corresponding device,
wherein each menu item of the plurality of menu items includes a representative icon of the menu item, a function name and a name of a device providing a function of the menu item,
wherein when a plurality of devices providing only one same function are connected, the plurality of devices are associated with a first menu item of the plurality of menu items, the first menu item changes the name of the device providing the function of the first menu item without changing the function name and the representative icon of the first menu item according to a first user command, and
wherein when a device providing a plurality of functions is connected, the device providing a plurality of functions is associated with a second menu item, the second menu item changes the function name of the menu item without changing the name of the device and the representative icon of the second menu item according to a second user command.

2. The method according to claim 1, wherein, in the GUI screen, menu items of the same type of devices, among the one or more devices included in one or more signal sources, are displayed under the condition that they are grouped into one group.

3. The method according to claim 1, wherein, in the GUI screen, menu items of devices corresponding to the same type of signal sources, among the one or more devices included in the one or more signal sources, are displayed under the condition that they are grouped into one group.

4. The method according to claim 1, wherein, in the GUI screen, menu items of devices selectable by a user, among the one or more devices included in the one or more signal sources, and menu items of devices non-selectable by the user are displayed distinguishably from each other.

5. The method according to claim 1, wherein, in the GUI screen, a menu item of a device selected by a user, among the one or more devices included in the one or more signal sources, and menu items of the other devices not selected by the user are displayed distinguishably from each other.

6. The method according to claim 1, wherein, in the GUI screen, a menu item of a device currently in operation, among the one or more devices included in the one or more signal sources, and menu items of the other devices not in operation are displayed distinguishably from each other.

7. The method according to claim 1, wherein the checking the connection states of the one or more signal sources to the signal sink comprises checking a connection state of each of the one or more devices included in the one or more signal sources to the signal sink by identifying a unique address recorded in each of the one or more devices included in the one or more signal sources.

8. The method according to claim 1, further comprising:
generating a command for control of the corresponding device when it is determined that the corresponding device is in its on state; and
transmitting the generated control command to the corresponding device to operate the corresponding device.

9. The method according to claim 1, wherein the generating the signal includes generating a command for control of the corresponding device and transmitting the generated control command with the generated turning on signal.

10. The method according to claim 1, wherein, in the GUI screen, each of the menu items is indicated by at least one of a device name or an icon.

11. A media signal sink with a graphic user interface (GUI) function connected with one or more signal sources each having one or more devices, the media signal sink comprising:
a main processor to check connection states of the one or more signal sources to the signal sink;
a GUI screen creator to create a GUI screen to display a plurality of menu items associated with one or more devices included in the one or more signal sources connected to the signal sink, based on a result of the connection state check of the main processor; and
a display device to display the GUI screen created by the GUI screen creator,
wherein the main processor, when a specific one menu item of the plurality of menu items displayed in the GUI screen is selected, determines whether a device corresponding to the selected specific menu item, among the one or more devices included in the one or more signal sources, is in its on or off state, generates a signal for turning-on the corresponding device when it is determined that the corresponding device is in its off state, and transmits the generated turning-on signal to the corresponding device to operate the corresponding device, wherein each menu item of the plurality of menu items includes a representative icon of the menu item, a function name and a name of a device providing a function of the menu item, wherein when a plurality of devices providing only one same function are connected, the plurality of devices are associated with a first menu item of the plurality of menu items, the first menu item changes the name of the device providing the function of the first menu item without changing the function name and the representative icon of the first menu item according to a first user command, and wherein when a device providing a plurality of functions is connected, the device providing a plurality of functions is associated with a second menu item, the second menu item changes the function name of the menu item without changing the name of the device and the representative icon of the second menu item according to a second user command.

12. The media signal sink according to claim 11, wherein the display device displays menu items of the same type of devices, among the one or more devices included in the one or more signal sources, in the GUI screen under the condition that they are grouped into one group.

13. The media signal sink according to claim 11, wherein the display device displays menu items of devices corresponding to the same type of signal sources, among the one or more devices included in the one or more signal sources, in the GUI screen under the condition that they are grouped into one group.

14. The media signal sink according to claim 11, wherein the display device displays menu items of devices selectable by a user, among the one or more devices included in the one or more signal sources, and menu items of devices non-selectable by the user in the GUI screen distinguishably from each other.

15. The media signal sink according to claim 11, wherein the display device displays a menu item of a device selected by a user, among the one or more devices included in the one or more signal sources, and menu items of the other devices not selected by the user in the GUI screen distinguishably from each other.

16. The media signal sink according to claim 11, wherein the display device displays a menu item of a device currently in operation, among the one or more devices included in the one or more signal sources, and menu items of the other devices not in operation in the GUI screen distinguishably from each other.

17. The media signal sink according to claim 11, wherein the main processor checks a connection state of each of the one or more devices included in the one or more signal sources to the signal sink by identifying a unique address recorded in each of the one or more devices included in the one or more signal sources.

18. The media signal sink according to claim 17, further comprising an auxiliary processor to transmit/receive a GUI frame containing the unique address to/from each of the one or more signal sources and to output the received GUI frame to the main processor.

19. The media signal sink according to claim 11, wherein the main processor, generates a command for control of the corresponding device when it is determined that the corresponding device is in its on state and transmits the generated control command to the corresponding device to operate the corresponding device.

20. The media signal sink according to claim 11, wherein the main processor further generates a command for control of the corresponding device when it is determined that the corresponding device is in its off state and transmits the generated control command with the generated turning on signal.

21. The method according to claim 1, wherein whether or not one of the displayed menu items is changed according to the first or second user command is determined according to a result of the connection state check.

22. The method according to claim 1, wherein at least one of the displayed menu items is distinguishably displayed from other menu items according to types of the one or more devices included in the one or more signal sources connected to the signal sink.

23. The media signal sink according to claim 11, wherein whether or not one of the displayed menu items is changed according to the first or second user command is determined according to a result of the connection state check.

24. The media signal sink according to claim 11, wherein at least one of the displayed menu items is distinguishably displayed from other menu items according to type of the one or more devices included in the one or more signal sources connected to the signal sink.

* * * * *